United States Patent
Osama et al.

(10) Patent No.: US 11,333,196 B2
(45) Date of Patent: May 17, 2022

(54) THRUST ACTIVE MAGNETIC BEARING FOR SHAFT SLOW ROLL CONTROL

(71) Applicant: Baker Hughes, a GE company, LLC, Houston, TX (US)

(72) Inventors: Mohamed Osama, Garching (DE); Rosa Castane Selga, Garching (DE); Duccio Fioravanti, Florence (IT); Massimiliano Ortiz Neri, Florence (IT)

(73) Assignee: Baker Hughes, a GE Company, LLC, Houston, TX (US)

( * ) Notice: Subject to any disclaimer, the term of this patent is extended or adjusted under 35 U.S.C. 154(b) by 264 days.

(21) Appl. No.: 16/461,940

(22) PCT Filed: Nov. 16, 2017

(86) PCT No.: PCT/US2017/062021
§ 371 (c)(1),
(2) Date: May 17, 2019

(87) PCT Pub. No.: WO2018/094051
PCT Pub. Date: May 24, 2018

(65) Prior Publication Data
US 2019/0301527 A1    Oct. 3, 2019

Related U.S. Application Data (60) Provisional application No. 62/423,381, filed on Nov. 17, 2016.

(51) Int. Cl.
*H02K 7/09* (2006.01)
*F16C 32/04* (2006.01)

(52) U.S. Cl.
CPC ...... *F16C 32/0461* (2013.01); *F16C 32/0476* (2013.01); *H02K 7/09* (2013.01); *F16C 2360/24* (2013.01)

(58) Field of Classification Search
CPC ... H02K 7/09; F16C 32/0461; F16C 32/0476; F16C 2360/24; F16C 2360/00; F16C 32/0485; F16C 32/0495
(Continued)

(56) References Cited

U.S. PATENT DOCUMENTS 4,296,344 A    10/1981  Rabe
4,740,738 A *   4/1988  El-Antably ............. H02P 3/065
                                                    318/701
(Continued)

FOREIGN PATENT DOCUMENTS

JP    2001124077 A  *  5/2001
JP    2001124077 A     5/2001
(Continued)

OTHER PUBLICATIONS

Fukuda, et al., Load Characteristics of Induction Motor Made of Soft Magnetic Composite. International Conference on Electrical Machines and Systems 2008. Oct. 2008.
(Continued)

*Primary Examiner* — Thomas Truong
(74) *Attorney, Agent, or Firm* — Mintz Levin Cohn Ferris Glovsky and Popeo, P.C.

(57) ABSTRACT

A thrust magnetic bearing integrated with an induction machine and methods for using the same for slow roll control of rotors and other rotating components is provided. The rotor can include a shaft and a thrust bearing disk. The thrust magnetic bearing can include thrust bearing stators positioned axially adjacent to the thrust bearing disk and they can be configured to apply axial magnetic forces to the thrust bearing disk. The induction machine can be configured to generate a rotating magnetic field that causes a torque to be applied to the thrust bearing disk in a predetermined rotational direction. In one aspect, the induction
(Continued)

machine can include a radial stator positioned adjacent to a circumference of the thrust bearing disk and two or more circumferentially offset windings. In another aspect, the induction machine can position the two or more circumferentially offset windings on the thrust bearing stators.

8 Claims, 4 Drawing Sheets

(58) Field of Classification Search
USPC .......................................................... 310/90.5
See application file for complete search history.

(56) References Cited

U.S. PATENT DOCUMENTS

| | | | |
|---|---|---|---|
| 5,010,267 A | 4/1991 | Lipo et al. | |
| 5,250,865 A | 10/1993 | Meeks | |
| 6,121,704 A | 9/2000 | Fukuyama et al. | |
| 6,288,465 B1* | 9/2001 | Suzuki | F16C 32/00 219/648 |
| 2003/0218400 A1 | 11/2003 | Rimmel | |
| 2007/0132328 A1* | 6/2007 | Yamakata | H02K 1/185 310/90.5 |
| 2014/0167543 A1* | 6/2014 | Upadhyay | H02K 7/09 310/90.5 |

FOREIGN PATENT DOCUMENTS

| | | |
|---|---|---|
| JP | 2010071304 A | 4/2010 |
| JP | 2012205453 A | 10/2012 |
| JP | 2014079042 A | 5/2014 |

OTHER PUBLICATIONS

International Search Report and Written Opinion issued in corresponding International Application No. PCT/US2017/062021, dated Feb. 1, 2018, 10 pages.

* cited by examiner

THRUST ACTIVE MAGNETIC BEARING FOR SHAFT SLOW ROLL CONTROL

CROSS-REFERENCE TO RELATED APPLICATIONS

This application claims the benefit of U.S. Provisional Application No. 62/423,381, filed Nov. 17, 2016, entitled "Integrated Thrust Active Magnetic Bearing," the entirety of which is incorporated by reference.

BACKGROUND

Turbomachines are devices that transfer energy to or from a continuously moving fluid. One example of a turbomachine is a turbine, which can include a rotor having a rotatable shaft and outwardly extending blades attached to the shaft. A moving fluid (e.g., air) can push against the rotor blades, transferring motion energy to the rotor blades, and causing the rotor to rotate. The motion energy transferred to the rotor can be used for applications such as propulsion or power generation.

During operation of a turbomachine, a rotor can spin at very high speed. While the shaft can be designed to remain straight (e.g., horizontal) along its length, some turbomachines (e.g., steam turbines, large compressors, gas turbines, etc.) can undergo bowing before or during startup or shutdown. As an example, bowing can occur when stationary prior to startup due to the weight of the rotor. Additionally or alternatively, bowing can occur during startup or shutdown due to non-uniform heating or cooling. If a rotor is spun at high speed while the shaft is bowed by even a small amount (e.g., 0.01 inch), the rotor can rotate eccentrically and lead to damage due to vibration or rubbing with stationary components.

SUMMARY

A thrust magnetic bearing integrated with an induction machine and methods for using the same for slow roll control of rotors is provided. The rotor can include a rotatable shaft and a cageless non-laminated rotor disk mounted thereto. The thrust magnetic bearing can include two ring-shaped thrust bearing stators, positioned adjacent to axially opposing sides of the rotor disk. The thrust bearing stators can be configured to apply axial magnetic forces to the thrust bearing disk for control an axial position of the rotor. An induction machine can be configured to generate a rotating magnetic field that impinges the rotor disk for slow roll control of the rotor. The rotating magnetic field can cause a torque to be applied to the rotor disk. By controlling the direction and magnitude of the applied torque, the rotor speed can be controlled.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Turbines and compressors are examples of turbomachines, which are devices that include a rotor having a shaft that can rotate when fluids (e.g., air) push against blades that extend from the shaft. The shaft can be connected to other devices, allowing the rotational energy of the shaft to be used for applications such as propulsion and/or electrical power generation, during normal operation. To avoid damage to a turbomachine, it can be desirable to ensure that the shaft is substantially straight (e.g., not bowed) during startup, before normal operation, and/or during shutdown, after normal operation. To this end, the shaft can be rotated at low speeds (e.g., about 0 rpm to about 100 rpm) during startup and/or during shutdown to counteract shaft bowing.

Slow roll can be performed using a turning gear that frictionally engages a rotor shaft (e.g., via a toothed wheel coupled to the rotor shaft). However, turning gears can be problematic. In one example, the rotation force needed to overcome the weight of the rotor and friction during startup, referred to as breakaway torque, can be relatively high for turbomachines supported by oil bearings. A relatively large turning gear can be employed to overcome this large breakaway torque. However, a large turning gear can occupy a volume that requires an extension of the rotor shaft to accommodate its size. This increase in the overall size of the turbomachine can be undesirable in space constrained environments. In another example, turning gears can present a safety risk when engaged with a rotor shaft spinning at high speed due to a greater likelihood of ejection of parts arising from spurious engagement.

Accordingly, improved systems and methods are provided for slow roll control of rotating components, such as turbomachine rotors. Magnetic bearings can be used to magnetically levitate a turbomachine shaft and a device, referred to as an induction machine, can be integrated with a portion of the magnetic bearing. The induction machine can be configured to magnetically engage the rotor to control slow roll. The magnetic bearings can provide substantially frictionless rotation and reduce the rotational forces required to start and maintain slow roll. As a result, an induction machine can be relatively small. Furthermore, because its engagement with the shaft is magnetic (contactless), an induction machine can present a lower safety risk compared to a turning gear.

Embodiments of the disclosed systems can include at least one active magnetic bearing and an induction machine.

Examples of active magnetic bearings can include thrust magnetic bearings, radial magnetic bearings, and combinations thereof. A radial magnetic bearing can be configured to levitate a rotor, reducing the breakaway torque. The rotor can include a rotatable shaft and a cageless non-laminated rotor disk mounted to the shaft. The thrust magnetic bearing can include two ring-shaped thrust bearing stators, each positioned adjacent to axially opposing sides of the rotor disk. The thrust bearing stators can be configured to control an axial position of the rotor by generating stationary axial magnetic fields that cause axial magnetic forces to be applied the thrust bearing disk.

An induction machine can be configured to control slow roll of the rotor. As an example, it can generate a rotating magnetic field that impinges the rotor disk. Due to the cageless and non-laminated construction of the rotor disk, the rotating magnetic field can induce eddy currents in the rotor disk and it can cause a torque to be applied to the rotor disk. By controlling the direction and magnitude of the applied torque, the rotor speed can be controlled.

The induction machine can adopt a variety of configurations. In a first embodiment, the induction machine can include a radial stator positioned adjacent to an outer periphery of the rotor disk. Two or more multiphase windings can be coupled to the stator and they can be circumferentially offset from one another. In a second embodiment, the induction machine can include two or more multiphase windings coupled to each thrust stator and they can be circumferentially offset from one another. In either case, by exciting the multiphase windings with balanced multiphase currents/voltages, the rotating magnetic field can be produced for applying the torque to the rotor disk.

Exemplary technical effects of the methods, systems, and devices described herein can include, by way of non-limiting example, improved slow roll control of turbomachines, as compared to turning gears. In one aspect, substituting an induction machine according to the disclosed embodiments for a turning gear can reduce skid and shaft dimensions of a turbomachine shaft. In another aspect, safety issues due to spurious turning device engagement at full speed can be substantially eliminated because the induction machine can contactlessly apply torque to the rotor. In a further aspect, the use of active magnetic bearings can substantially reduce the breakaway torque and power required to maintain a predetermined slow roll speed. In an additional aspect, certain embodiments of the induction machine can substantially avoid degradation in thrust bearing performance (e.g., static and/or dynamic force capability) of the magnetic thrust bearing. In another aspect, embodiments of the induction machine can apply torque to a thrust bearing disk to increase a rotational speed of a rotor during startup or as a braking system to decrease the rotational speed of the rotor during shutdown.

Embodiments of thrust active magnetic bearings having an integrated induction machine and corresponding methods of use for slow roll control of turbomachines are discussed herein. However, embodiments of the disclosure can be employed for slow roll control of other rotating components without limit.

Figure 1:
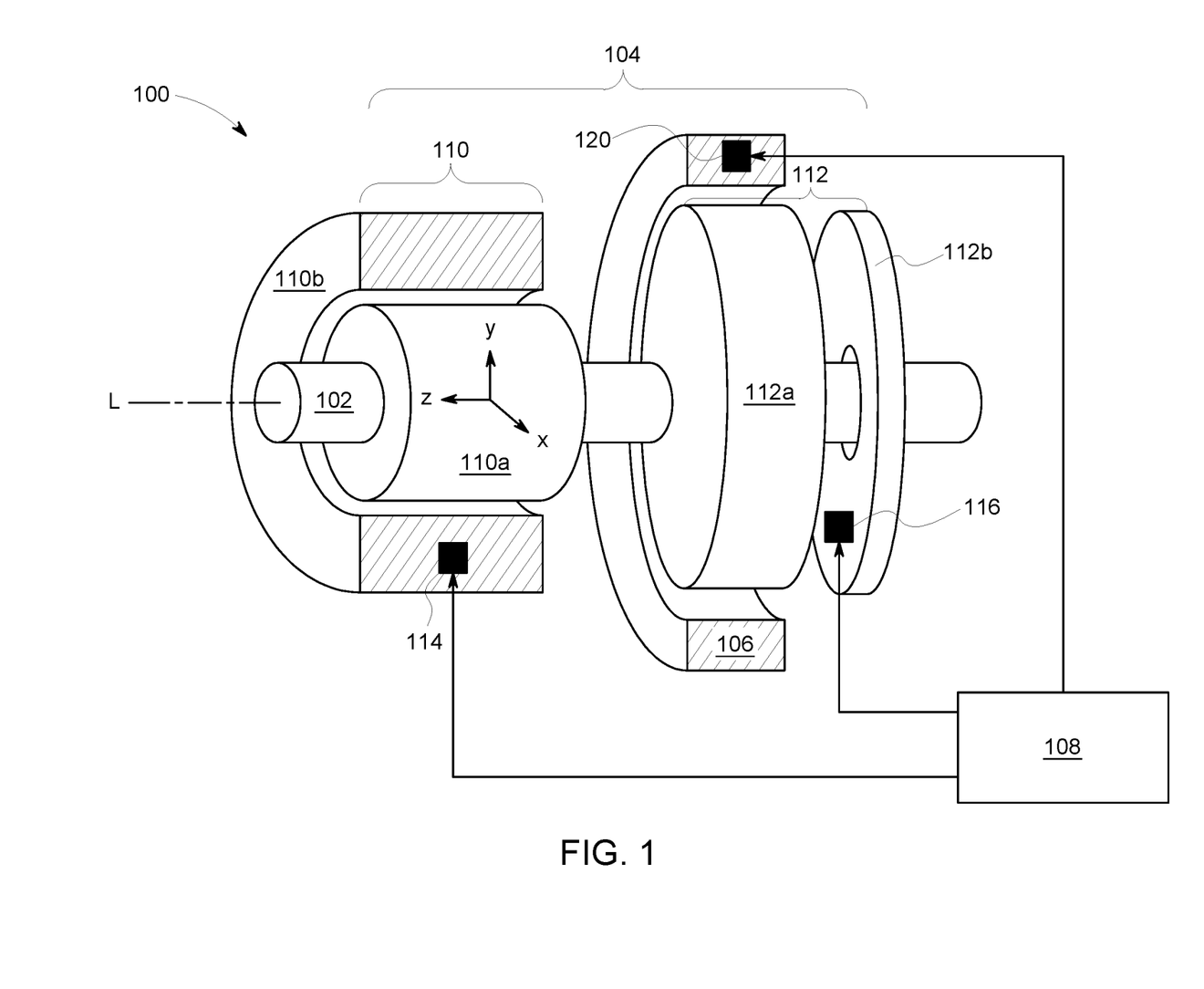
FIG. 1 is a diagram illustrating one exemplary embodiment of an operating environment containing an induction machine integrated with a magnetic thrust bearing for slow roll control of a rotor.

FIG. 1 illustrates one exemplary embodiment of an operating environment 100 containing a shaft 102, an active magnetic bearing 104, an induction machine 106, and a controller 108. The shaft 102 can be configured to rotate about a longitudinal axis L and it can be part of a rotor connected to a load (not shown). The active magnetic bearing 104 can include at least one radial magnetic bearing 110 and an axial or thrust magnetic bearing 112. The radial magnetic bearing 110 can include a radial bearing rotor 110a coupled to the shaft 102 and a radial bearing stator 110b positioned about a radial circumference of the radial bearing rotor 110a. The thrust magnetic bearing 112 can include a thrust bearing disk 112a and a pair of thrust bearing stators 112b. The thrust bearing stators 112b can be positioned on opposed axial sides of the thrust bearing disk 112a. Only one thrust bearing stator 112b is illustrated in FIG. 1 for clarity.

In use, the active magnetic bearing 104 can be configured to control radial and axial positions of the shaft 102. The radial bearing rotor 110a can be configured to apply radial magnetic forces to the radial bearing stator 110b that are sufficient to magnetically levitate the shaft 102 and to adjust a radial position of the shaft 102 with respect to the longitudinal axis L. The thrust bearing stator 112b can be configured to apply axial magnetic forces to the thrust bearing disk 112a to adjust an axial position of the shaft 102 along the longitudinal axis L. As an example, both the radial bearing stator 110b and the thrust bearing stator 112b can include electromagnets 114, 116, respectively, in communication with the controller 108. Radial position sensors (not shown) can be employed to measure radial gaps between the radial bearing rotor 110a and the radial bearing stator 110b. Axial position sensors (not shown) can be employed to measure axial gaps between the thrust bearing disk 112a and the thrust bearing stators 112b. These axial and radial gap measurements can be communicated to the controller 108, which can in turn control electrical currents/voltages provided to the electromagnets 114, 116. In this manner, magnetic fields can be generated that cause radial and axial magnetic forces to be applied to the rotor (e.g., the shaft 102 and the thrust disk 112a) for adjusting the radial and axial gaps if they deviate from predetermined ranges (e.g., due to vibration or other motion).

As shown in FIG. 1, the induction machine 106 can be in the form of a ring-shaped stator positioned radially adjacent to an outer circumference of the thrust bearing disk 112a. As discussed in greater detail below, the stator can include windings 120 in communication with the controller 108. The controller 108 can provide multiphase currents/voltages to the windings 120 to generate a rotating magnetic field (e.g., in the plane of the thrust bearing disk 112a). The rotating magnetic field can in turn cause a torque to be applied to the thrust bearing disk 112a. By controlling the multiphase currents/voltages provided to the windings 120, the direction and magnitude of the applied torque can be changed, allowing control of slow roll of the shaft 102. In this manner, the induction machine 106 can act as a replacement for a turning gear.

The combination of the active magnetic bearing 104 and induction machine 106 can provide a variety of advantages in turbomachine applications. In one aspect, the radial magnetic bearing 110 can significantly reduce a shaft breakaway torque (BAT), as compared to turbomachines employing oil bearings.

The BAT for a turbomachine shaft supported by oil bearings can be directly linked to factors such as the rotor weight, the oil bearing diameter, an equivalent friction coefficient, and/or coupling pre-stretch. As the weight of the rotor (train power) increases, the BAT can become significant and a relatively large turning gear can be required to supply torque sufficient to overcome the BAT. In some cases, additional jacking oil devices (e.g., hydrostatic lifting systems) can also be necessary to lower the BAT and preserve bearing slide surfaces from premature wear due to lubrication limits at low start-up speed (e.g., less than about 100 rpm).

In contrast, the radial magnetic bearing 110 can magnetically levitate the shaft 102 and provide contactless support. As a result, the BAT of the shaft 102 can be approximately zero and a relatively small induction machine 106 can be employed to apply a torque exceeding the windage torque, which can arise due to friction between the rotor and the surrounding fluid environment, and inertia of the shaft 102. The induction machine 106 can also be configured to apply sufficient torque to maintain a desired slow roll rotation speed.

Estimates of the BAT required for oil bearings and for active magnetic bearings has been calculated by computer simulation and requirements for the turning systems are summarized in the table below. The simulations were performed for a representative multi-megawatt class motor compressor application, where the compressor can experience bowing when stationary and which can employ slow roll at startup to alleviate this bowing. The slow roll speed for the simulations is assumed to be 50 rpm and the resistant windage torque is calculated according to $k*(speed)^2$.

|  | Requirements for Turning Gear (rotors supported with oil bearings) | Requirements for Induction Machine 106 (rotors supported with active magnetic bearings) |
| --- | --- | --- |
| Minimum Required Torque | 1120 Nm (to overcome BAT) | 10 Nm (to reach desired turning speed within two min.) |
| Minimum Required Power | ~5500 W (to maintain turning speed) | ~50 W (to reach desired turning speed within two min) |

The simulations show that the calculated BAT for the oil bearing is 1111 Nm, while the BAT for the magnetic bearing is nearly zero due to the absence of breakaway friction for magnetic levitation. Once the rotation speed of 50 rpm is reached, the power calculated to maintain this speed for the oil bearings condition is about 5500 W while about 50 W for the magnetic bearing condition are required. From these simulations, it can be observed that the torque and power required for turning the shaft 102 using the active magnetic bearing 104 is on the order of 1% of that required for oil bearings.

Figure 2:
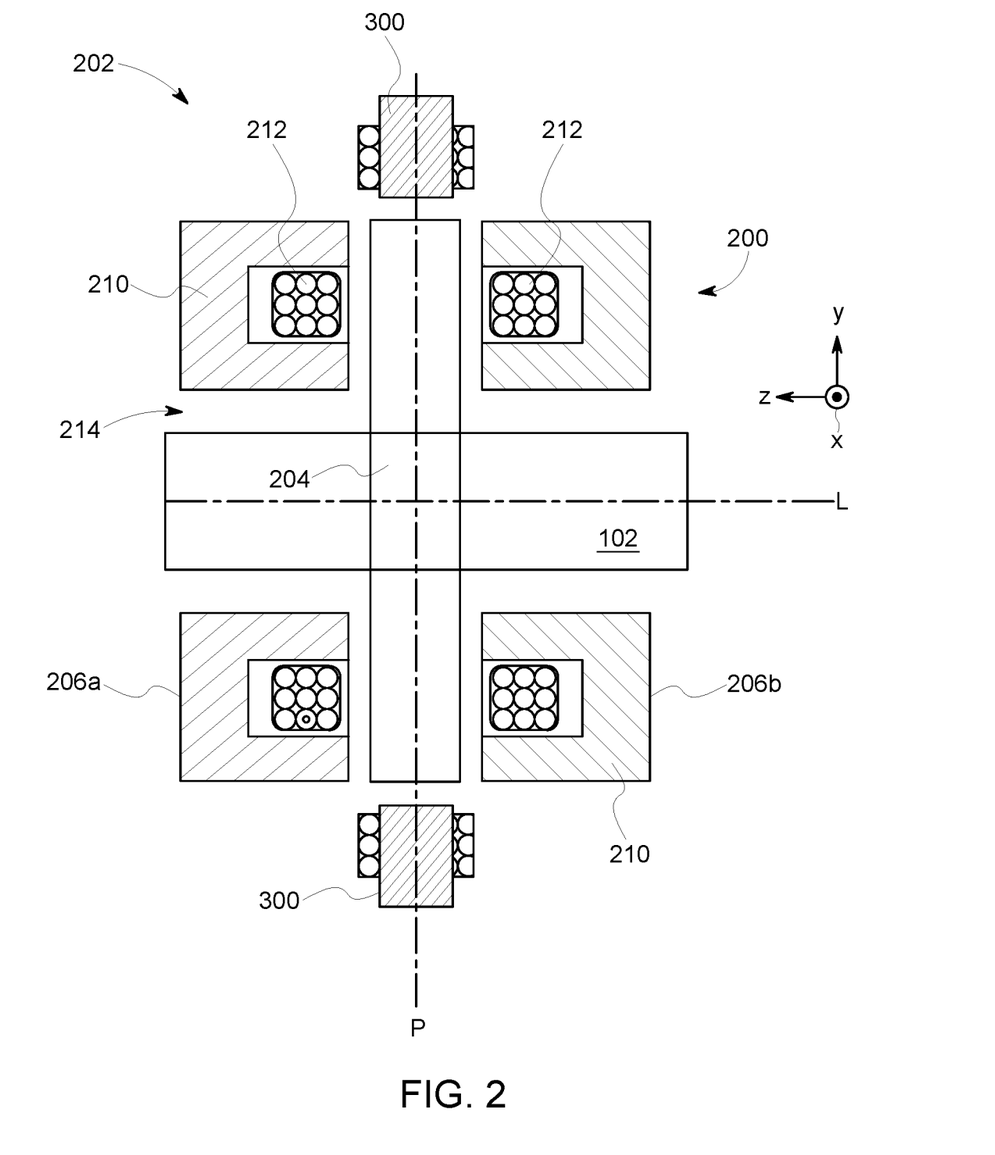
FIG. 2 is a side cross-sectional view of one exemplary embodiment of the thrust magnetic bearing and the induction machine of FIG. 1.

FIG. 2 is a side cross-sectional view illustrating an exemplary embodiment of a thrust magnetic bearing 200 integrated with a radial flux induction machine 202. As shown, the thrust magnetic bearing 200 includes a thrust bearing disk 204 and a pair of thrust bearing stators 206a, 206b. The thrust bearing disk 204 can be a cageless non-laminated (e.g., solid) disk formed from a ferromagnetic material. The thrust bearing disk 204 can be mounted on the shaft 102 and it can extend radially outward therefrom (e.g., from the longitudinal axis L) along an axis P. In certain embodiments, the radial axis P can be substantially orthogonal to the longitudinal axis L.

The thrust bearing stators 206a, 206b can be secured to a housing (not shown) such that they are stationary and positioned axially adjacent to opposing sides of the thrust bearing disk 204. In certain embodiments, the radial position of the thrust bearing stators 206a, 206b can be approximately axially centered about the longitudinal axis L. As shown, each of the thrust bearing stators 206a, 206b can include a core 210 and electrically conductive windings 212 in electrical communication with the controller 108. The core 210 can be formed in a ring-shape and include an aperture 214 dimensioned to receive the shaft 102 therethrough. As discussed below, embodiments of the core 210 can be laminated or non-laminated and it can be configured to carry a magnetic flux. Non-laminated embodiments of the core 210 can be formed from a soft magnetic composite.

The electrically conductive windings 212 can extend along channels formed within the core 210. When currents/voltages are supplied to the windings 212 (e.g., under control of the controller 108), each of the thrust bearing stators 206a, 206b can act as an electromagnet and generate a magnetic field. The thrust bearing stator 206a can generate a stationary (e.g., non-rotating) magnetic field that provides a first axial magnetic force which can attract the thrust bearing disk 204 towards the thrust bearing stator 206a (e.g., towards the left in FIG. 2). The thrust bearing stator 206b can generate a stationary (e.g., non-rotating) magnetic field that provides a second axial magnetic force that attracts the thrust bearing disk 204 towards the thrust bearing stator 206b (e.g., towards the right in FIG. 2). By controlling the first and second axial magnetic forces, the axial position of the thrust bearing disk 204 can be controlled to inhibit axial contact between the thrust bearing disk 204 with the thrust bearing stators 206a, 206b.

Embodiments of the core 210 can be provided in a variety of configurations. In one aspect, the core 210 can be formed in an axisymmetric C-core electromagnet topology, as illustrated in FIG. 2. The C-core topology can be beneficial, as it can require half the armature turns to achieve the same magnetic force as the E-core topology. In another aspect, not shown, the core 210 can be formed in an axisymmetric E-core electromagnet topology for holding the windings 212. The E-core topology can be beneficial, as it can provide inherent flux path splitting, which can allow for lower dimensions of both the stator back-iron and the thickness of the thrust bearing disk 204.

Figure 3:
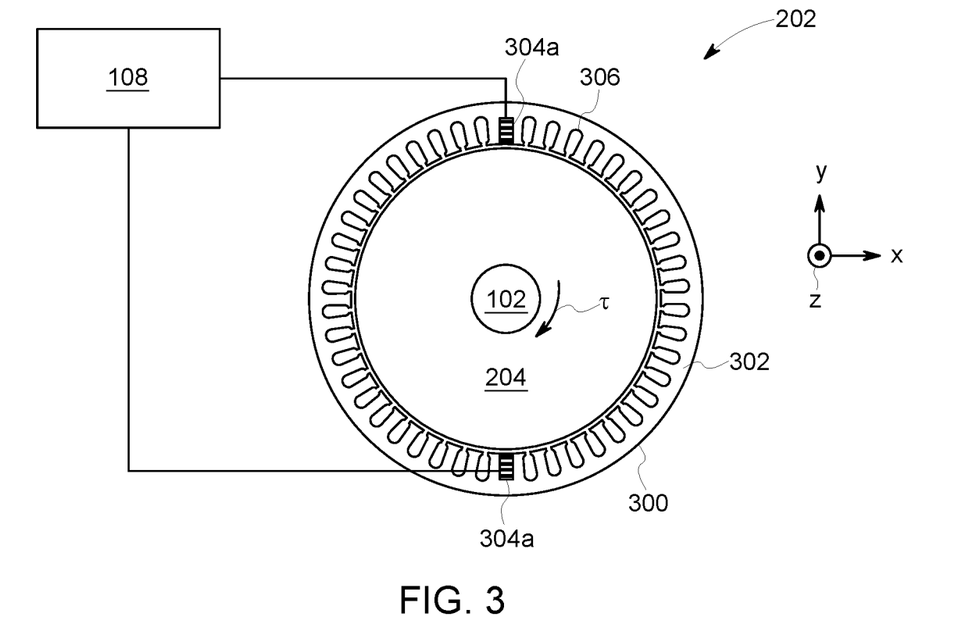
FIG. 3 is a front view of a thrust disk of the rotor and the induction machine of FIG. 2.

FIG. 3 is a front view further illustrating the induction machine 202 and the thrust disk 204. The induction machine 202 can be in the form of a cageless, non-laminated rotor induction machine integrated it can be configured to apply a torque τ to the thrust bearing disk 204 for controlling slow roll of the shaft 102. As shown, the induction machine 202 can include a ring-shaped radial flux stator 300 having a flux stator core 302 and two or more electrically conductive windings 304a, 304b coupled to the flux stator core 302. As discussed below, the electrically conductive windings 304a, 304b can be configured to generate a rotating magnetic field when supplied with currents/voltages under the control of the controller 108.

The flux stator core 302 can define the ring shape of the flux stator 300 and it can have an inner radial surface that is radially offset from an outer radial surface of the thrust bearing disk 204. Two or more circumferentially offset slots 306 can be formed through a thickness of the flux stator core 302 and the windings 304a, 304b can be wound through adjacent ones of the slots 306 for coupling to the flux stator core 302.

The windings 304a, 304b can be electrically coupled to a multiphase current/voltage source controlled by the controller 108. By exciting the windings 304a, 304b with balanced multiphase currents/voltages via a power converter, a magnetic field can be generated that rotates in a predetermined direction about the longitudinal axis L (e.g., clockwise within the page). The rotating magnetic field can induce eddy currents in the thrust bearing disk 204 and these eddy currents can cause a torque τ to be applied to the thrust bearing disk 204 in the predetermined rotation direction. The direction of the applied torque τ can be reversed by reversing the sequence of the balanced multiphase currents/voltages supplied by the power converter to the windings 304b.

The number of windings 304a, 304b and the number of phases of the supplied currents/voltages can be varied without limit. As an example, FIG. 3 illustrates 48 slots 306 formed in the flux stator core 302. In an embodiment, the flux stator core 302 can be wound with a distributed, 16 pole, three-phase winding. Distributed windings can reduce subharmonics and minimize ripple during slow roll. In this case, a variable frequency supply voltage of up to about 8 Hz can accelerate the shaft 102 to about 60 rpm. By exciting the multiphase windings of the flux stator 300 by balanced, multiphase currents/voltages via a power converter (not shown), the rotating magnetic field be generated and the torque τ can be applied to the thrust bearing disk 204.

In another example (not shown), a concentrated (tooth) multiphase winding can be employed. While such a configuration can exhibit higher torque ripple due to subharmonics, it can also have shorter end windings as compared to distributed windings. This shorter length can be advantageous in circumstances where space is constrained.

The configuration of the induction machine 202 can ensure that there is substantially no degradation in the performance (e.g., static and/or dynamic force capability) of the thrust magnetic bearing 200 during normal operation (e.g., during high speed rotation of the shaft 102). As an example, neither the thrust bearing stators 206a, 206b nor the thrust bearing disk 204 is modified to allow the torque r to be applied to the thrust bearing disk 204 by the induction machine 202. Instead, the induction machine 202 can integrated with the thrust magnetic bearing 200 by mounting the flux stator 300 radially adjacent to the thrust bearing disk 204. Furthermore, the induction machine 202 can be operated only during startup and shutdown, not during normal operation, to applying the torque r to the thrust bearing disk 204. Thus, the magnetic field generated by the induction machine 202 substantially avoid interference with axial magnetic forces generated by the thrust magnetic bearing 200.

In general, a cageless non-laminated rotor induction machine, such as the induction machine 202, can exhibit performance worse than a cage rotor induction machine. However, this disadvantage can be minimized in the case of the instant induction machine 202. In one aspect, because the induction machine 202 can be operated only during startup or shutdown, the time during which it is active can be small compared to the time of normal operation. In another aspect, as discussed above, the radial magnetic bearing 110 can provide radial magnetic levitation and the level of torque r required to be applied to the thrust bearing disk 204 for slow roll control can be relatively small due to the lack of bearing stiction. That is, the power consumed by the induction machine 202 can be relatively low because the magnitude of the applied torque r and its duration are both small. Thus, electrical inefficiencies arising to the use of a cageless non-laminated rotor induction machine for slow roll control are substantially outweighed by the space savings and safety improvements it can provide, compared to turning gears.

Figure 4:
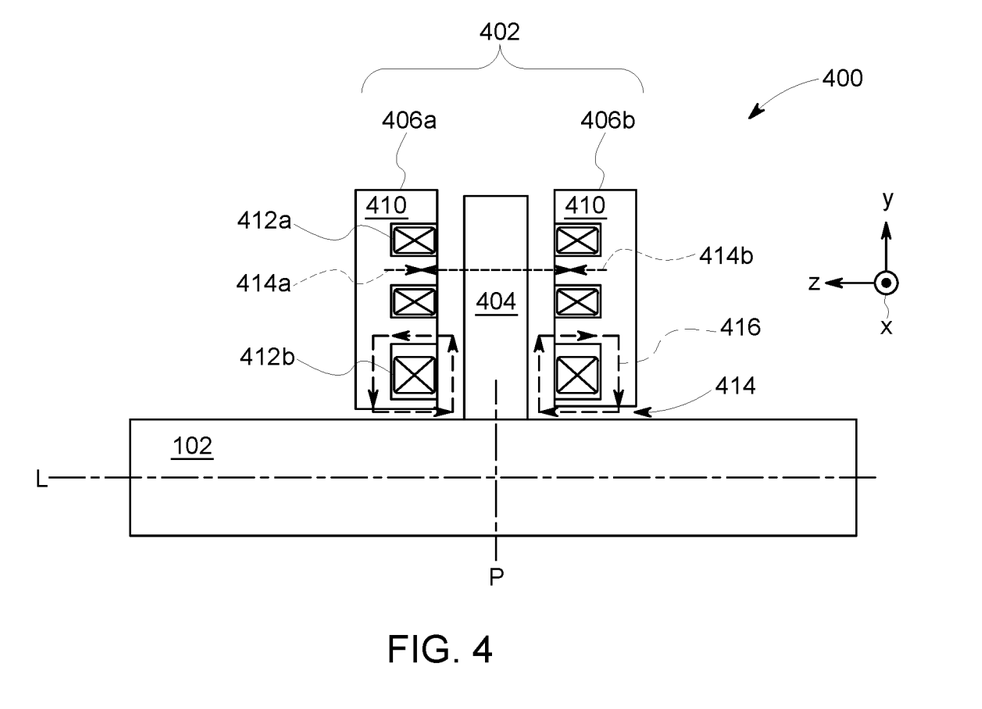
FIG. 4 is a side cross-sectional view of another exemplary embodiment of an operating environment containing an induction machine integrated with a magnetic thrust bearing for slow roll control of a rotor.
Figure 5:
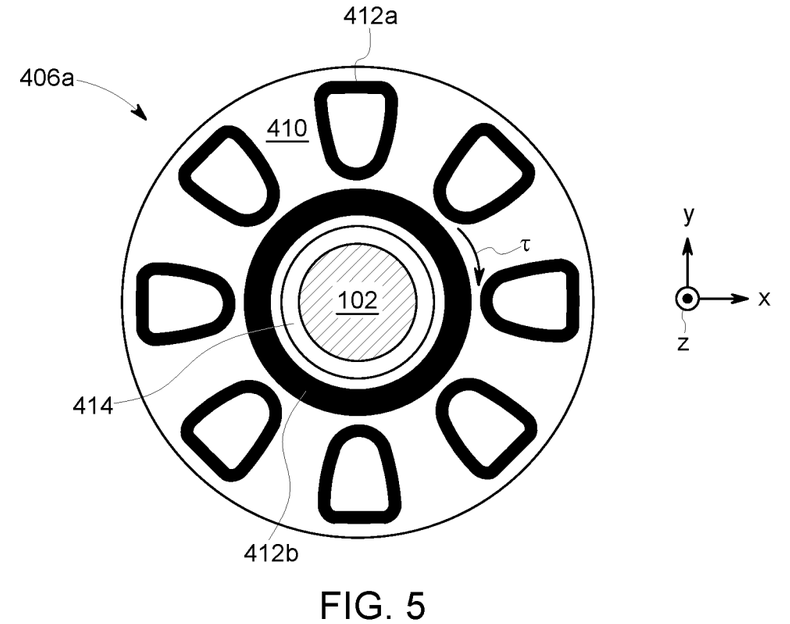
FIG. 5 is a side cross-sectional view of the integrated thrust bearing and induction machine of FIG. 4.

Another exemplary embodiment of a thrust magnetic bearing 400 integrated with an axial flux induction machine 402 for slow roll control of a rotor is illustrated in FIGS. 4-5. As discussed in greater detail below, in contrast to the thrust magnetic bearing 200, the thrust bearing stators of the thrust magnetic bearing 400 can be modified to include the induction machine 402. In this manner, magnetic fields can be generated by thrust bearing stators to apply axial and rotational magnetic forces to a thrust bearing disk for axial stabilization and slow roll control.

FIG. 4 is a side cross-sectional view illustrating one half of the thrust magnetic bearing 400 and the induction machine 402. The remaining half (e.g., lower half) of the thrust magnetic bearing 400 and the induction machine 402 is symmetrical about the longitudinal axis L with the illustrated half and is omitted for clarity. As shown, the thrust magnetic bearing 400 includes a thrust bearing disk 404 and a pair of thrust bearing stators 406a, 406b. Similar to the thrust bearing disk 204 of FIG. 2, the thrust bearing disk 404 can be a cageless non-laminated (e.g., solid) disk formed from a ferromagnetic material. The thrust bearing disk 404 can be mounted on the shaft 102 and it can extend radially outward therefrom (e.g., from the longitudinal axis L) along an axis P. In certain embodiments, the radial axis P can be substantially orthogonal to the longitudinal axis L.

The thrust bearing stators 406a, 406b can be secured to a housing (not shown) such that they are positioned at axially opposing sides of the thrust bearing disk 404. In certain embodiments, the radial position of the thrust bearing stators 406a, 406b can be approximately axially centered about the longitudinal axis L. As shown, each of the thrust bearing stators 406a, 406b can include a core 410 and first electrically conductive windings 412a and second electrically conductive windings 412b in electrical communication with the controller 108. Each core 410 can be formed in a ring shape with an aperture 414 dimensioned to receive the shaft 102 therethrough. The electrically conductive windings 412a, 412b can extend along channels formed within each core 410. As discussed below, the core 410 can be laminated or non-laminated and it can be configured to carry a magnetic flux. Non-laminated embodiments of the core 410 can be formed from a soft magnetic composite.

The electrically conductive windings 412a, 412b can extend along channels formed within each core 410 and have a closed loop configuration. When currents/voltages are supplied to the windings 412a, 412b (e.g., under control of the controller 108), each of the thrust bearing stators 406a, 406b can act as an electromagnet and generate magnetic fields.

The second windings 412b can be arranged in a generally circular-shaped channel formed within each of the thrust bearing stators 406a, 406b. In certain embodiments, the second windings 412b can be approximately radially centered with respect to the longitudinal axis L at a second radial distance. Currents/voltages supplied to the second windings 412b of the thrust bearing stator 406a can generate a stationary (e.g., non-rotating) magnetic field 414a that provides a first axial magnetic force which can attract the thrust bearing disk 204 towards the thrust bearing stator 406a (e.g., towards the left in FIG. 4). Currents/voltages supplied to the second windings 412b of the thrust bearing stator 406b can generate a stationary (e.g., non-rotating) magnetic field 414b that provides a second axial magnetic force that attracts the thrust bearing disk 404 towards the thrust bearing stator 406b (e.g., towards the right in FIG. 4). Each core 410 can be laminated or non-laminated to carry the magnetic flux. By controlling the first and second axial magnetic forces, the axial position of the thrust bearing disk 404 can be controlled to inhibit contact between the thrust bearing disk 404 with the thrust bearing stators 406a, 406b.

FIG. 5 is a front view further illustrating the thrust bearing stator 406a and the induction machine 402 mounted thereto. As shown, two or more channels having a closed-loop shape can be formed within the core 410 and they can be circumferentially offset from one another. A portion of the induction machine 402 can include the core 410 and two or more of the first windings 412a secured to the core 410. The two or more first windings 412a can be at a first radial distance from the longitudinal axis L that is greater than the second radial distance of the second windings 412b. In certain embodiments, the first windings 412a can be wound about adjacent ones of the channels in a toroidal configuration. Each of the first windings 412a can be electrically coupled to a multiphase current/voltage source controlled by the controller 108. The thrust bearing stator 406b can be similarly configured.

By exciting the first windings 412a in each of the thrust bearing stators 406a, 406b with balanced multiphase currents/voltages via a power converter, a first magnetic field can be generated that rotates in a predetermined direction with respect to the longitudinal axis L (e.g., clockwise within the page). The rotating magnetic field 416 can induce toroidal eddy currents in the thrust bearing disk 404 that can cause a torque τ to be applied to the thrust bearing disk 404 in the predetermined rotation direction. The direction of the applied torque τ can be reversed by reversing the sequence of the balanced multiphase currents/voltages supplied by the power converter to the windings 412a, 412b.

The number of first windings 412a and the number of phases of the supplied currents/voltages can be varied without limit. As an example, FIG. 5 illustrates 8 first windings 412a coupled to the core 410 and wound in a concentrated 4 pole two-phase winding. In this case, a variable frequency supply voltage of up to about 2 Hz can accelerate the shaft 102 to about 60 rpm. By exciting the multiphase windings of the thrust bearing stators 406a, 406b by balanced, multiphase currents/voltages via a power converter (not shown), the rotating magnetic field be generated and the torque τ can be applied to the thrust bearing disk 404.

Due to the space occupied by the first windings 412a, a degradation in performance (e.g., static and/or dynamic force capability) of the thrust magnetic bearing 400 can occur compared to a thrust magnetic bearing that does not include the first windings 412a. However, this degradation can be minimized due in the case of the induction machine 402. In one aspect, because the induction machine 402 can be operated only during startup or shutdown, the time duration that it is active can be small compared to the time of normal operation. In another aspect, as the radial magnetic bearing 110 can provide radial magnetic levitation, as discussed above, and the level of torque τ applied to the thrust bearing disk 404 for slow roll control can be relatively small due to the lack of bearing stiction. That is, the degradation in performance of the thrust magnetic bearing 400 only occurs for the relatively short duration startup and/or shutdown. Furthermore, this degradation in performance can be substantially ignored, because the magnitude of the torque τ is relatively low.

Figure 6:
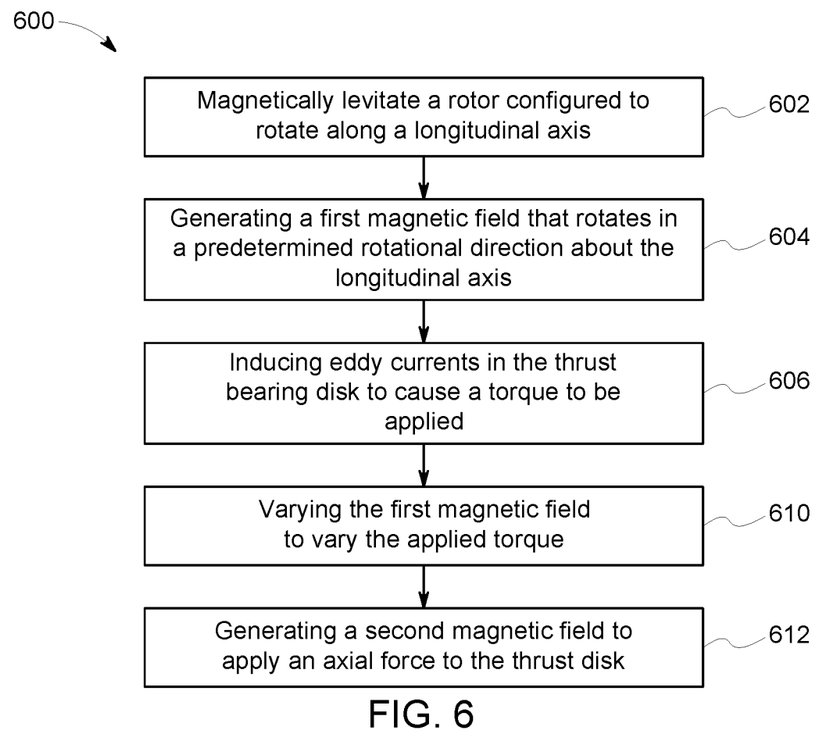
FIG. 6 is a flow diagram illustrating an exemplary embodiment of a method for slow roll control of a shaft.

FIG. 6 is a flow diagram illustrating one exemplary embodiment of a method 600 for slow roll control of a rotor (e.g., the shaft 102). As shown, the method 600 can include operations 602-612. The method 600 is described below described in connection with a turbomachine. However, embodiments of the method 600 are not limited to use with turbomachines and they can be employed with any rotating component. In certain aspects, embodiments of the method 600 can include greater or fewer operations than illustrated in FIG. 6 and the operations can be performed in a different order than illustrated in FIG. 6.

In operation 602, a rotor configured to rotate about a longitudinal axis can be magnetically levitated. The rotor can include a shaft (e.g., shaft 102) positioned along the longitudinal axis L and a ferromagnetic thrust bearing disk (e.g., thrust bearing disk 204, 404) extending radially outward therefrom (e.g., along radial axis P). In certain embodiments, the rotor can be magnetically levitated by a radial magnetic bearing (e.g., radial magnetic bearing 110).

In operation 604, a first magnetic field can be generated. The first magnetic field can be configured to rotate in a predetermined rotational direction about the longitudinal axis L. As an example, the first magnetic field can be configured to rotate through the plane of the thrust bearing disk 204, 404. In certain embodiments, the first magnetic field can be generated by induction machine 202 of FIGS. 2-3 or the induction machine 402 of FIGS. 4-5.

In operation 606, eddy currents can be induced in the thrust bearing disk 204, 404. The eddy currents can be configured to cause a torque (e.g., torque τ) to be applied to the thrust bearing disk 204, 404 in the predetermined rotational direction. In certain embodiments, the eddy currents can be toroidal eddy currents.

In operation 610, at least one of a rotational speed and rotational direction of the first magnetic field can be varied. The variation in the first magnetic field can vary the torque τ applied to the thrust bearing disk 204, 404 and cause the shaft 102 to rotate at a predetermined rotational speed (e.g., the slow roll speed). In one aspect, the predetermined rotational speed can be greater than a rotational speed of the shaft 102 prior to generation of the first magnetic field (e.g., startup). In another aspect, the predetermined rotational speed can be less than a rotational speed of the shaft prior to generation of the first magnetic field (e.g., shutdown).

Optionally, in operation 612, a second magnetic field can be generated that applies an axial magnetic force to the thrust bearing disk. The axial magnetic force can cause the thrust bearing disk to maintain a predetermined axial location. In certain embodiments, the first magnetic field (e.g., generated by the induction machine 202) does not substantially interfere with the second magnetic field.

Embodiments of the present disclosure can be described in the following exemplary clauses, which may be combined in any fashion unless otherwise noted.

In one embodiment, a system for slow roll control is provided and it can include a thrust active magnetic bearing, and a cageless non-laminated rotor induction machine. The thrust active magnetic bearing can include a ferromagnetic thrust bearing disk and a pair of thrust bearing stators. The ferromagnetic thrust bearing disk can extending outward (e.g., radially outward) from a longitudinal axis and it can be configured to couple to a shaft extending along the longitudinal axis. Each of the pair of thrust bearing stators can be positioned axially adjacent to opposing sides of the thrust bearing disk. In certain embodiments, the pair of thrust bearing stators can be approximately centered with respect to the longitudinal axis. Each of the pair of thrust bearing stators can be configured to apply axial magnetic forces to the thrust bearing disk. The cageless non-laminated rotor induction machine can include a stator and a cageless non-laminated rotor. The stator can include ring-shaped stator core and two or more windings. The stator can have an inner radial surface that can be radially offset from at least a portion of an outer radial surface of the thrust bearing disk. The two or more windings can be coupled to the stator and they can be circumferentially offset from one another. The two or more stator windings can be configured to generate a magnetic field that rotates in predetermined rotation direction about the longitudinal axis and cause a torque to be applied the thrust bearing disk in the predetermined rotation direction.

In another embodiment, the rotating magnetic field does not substantially interfere with the axial magnetic forces applied to the thrust active magnetic bearing.

In another embodiment, the thrust bearing disk can be non-laminated and cageless.

In another embodiment, the stator core of the induction machine can be laminated.

In another embodiment, the stator core of the induction machine can be non-laminated and formed from a soft magnetic composite.

In another embodiment, the system can further include a shaft, and at least one radial magnetic bearing. The shaft can be coupled to the thrust bearing disk and it can be configured to rotate about the longitudinal axis in response to the torque applied to the thrust bearing disk. The at least one radial magnetic bearing can be configured to generate radial magnetic forces sufficient to support the shaft without contacting the at least one radial magnetic bearing.

In one embodiment, a system for slow roll control is provided and it can include a rotor and a pair of stators. The thrust bearing disk can be formed from a ferromagnetic material and it can extend outward (e.g., radially outward) from a longitudinal axis. The thrust bearing disk can be configured to couple to a shaft extending along the longitudinal axis. Each of the pair of stators can be positioned axially adjacent to opposing sides of the thrust bearing disk. In certain embodiments, the thrust bearing stators can be approximately centered with respect to the longitudinal axis. Each of the pair of stators can include a stator core, two or more first windings and second windings. The stator core can be ring-shaped and define an aperture extending therethrough. The two or more first windings can have a generally toroidal shape and they can be coupled to each stator at positions circumferentially offset from one another. The second windings can have a generally circular shape and they can be coupled to each stator core at a position that is approximately co-axial with the stator core aperture. Each of the first windings can be configured to generate a first magnetic field that rotates in predetermined rotation about the longitudinal axis that causes a torque to be applied to the thrust bearing disk in the predetermined rotational direction. The second windings can be configured to generate a second magnetic field that causes axial magnetic forces to be applied to the thrust bearing disk.

In another embodiment, the thrust bearing disk can be non-laminated and cageless.

In another embodiment, the stator core can be laminated.

In another embodiment, the stator core can be non-laminated and formed from a soft magnetic composite.

In another embodiment, each of the first windings can be positioned radially outward from the second windings.

In another embodiment, the system can include a shaft and a radial magnetic bearing. The shaft can be coupled to the thrust bearing disk and it can be configured to rotate about the longitudinal axis in response to a torque applied to the thrust bearing disk. The radial magnetic bearing can be configured to generate radial magnetic forces sufficient to support the shaft without contact and it can maintain a predetermined radial position of the shaft with respect to the longitudinal axis.

Methods for slow roll control are provided. In one embodiment, the method can include magnetically levitating a rotor. The rotor can include a shaft configured to rotate about a longitudinal axis positioned along the longitudinal axis and a ferromagnetic thrust bearing disk extending outward (e.g., radially) therefrom. The method can also include generating a first magnetic field that rotates in a predetermined rotational direction about the longitudinal axis and causes a torque to be applied to the thrust bearing disk in the predetermined rotational direction. The method further includes generating a second non-rotating magnetic field that is configured to cause axial magnetic forces to be applied to the thrust bearing disk. The method can further include varying the torque applied to the thrust bearing disk to cause the shaft to rotate at a predetermined rotational speed.

In another embodiment, the shaft can be magnetically levitated by a radial magnetic bearing.

In another embodiment, the first magnetic field can be generated by a cageless non-laminated rotor induction machine. The induction machine can include a stator and a cageless non-laminated rotor. The stator can include a ring-shaped stator core and two or more stator windings. The stator core can have an inner radial surface and it can be radially offset from at least a portion of an outer radial surface of the thrust bearing disk. The two or more stator windings can be coupled to the stator core and they can be circumferentially offset from one another. The cageless non-laminated rotor can include the ferromagnetic thrust bearing disk.

In another embodiment, the first magnetic field can be generated by a pair of stators, each positioned on axially opposing sides of the thrust bearing disk. In certain embodiments, the pair of stators can be approximately centered with respect to the longitudinal axis. Each of the pair of stators can include a stator core and two or more first windings. The stator core can be ring-shaped and define an aperture extending therethrough. The two or more first windings can have a generally toroidal shape and they can be coupled to the stator core at positions circumferentially offset from one another.

In another embodiment, each of the pair of stators can further include second windings configured to generate the second non-rotating magnetic field. The second windings can have a generally circular shape and they can be coupled to the stator core at a position approximately coaxial with the stator core aperture.

In another embodiment, the predetermined rotational speed can be greater than a rotational speed of the shaft prior to generation of the first rotating magnetic field.

In another embodiment, the predetermined rotational speed can be less than a rotational speed of the shaft prior to generation of the first rotating magnetic field.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A system for slow roll control, the system comprising:
   a rotor including a ferromagnetic thrust bearing disk extending outward from a longitudinal axis and configured to couple to a shaft extending along the longitudinal axis; and
   a pair of stators, each positioned axially adjacent to an opposing side of the thrust bearing disk, each of the pair of stators including,
      a ring-shaped stator core defining an aperture extending therethrough,
      two or more first windings each having a generally toroidal shape and coupled to the stator core at positions circumferentially offset from one another, and
      second windings having a generally circular shape coupled to the stator core at a position that is approximately co-axial with the stator core aperture;
   wherein the first windings are configured to generate a first magnetic field that rotates in predetermined rotation direction about the longitudinal axis and that a causes a torque to be applied to the thrust bearing disk in the predetermined rotational direction; and
   wherein the second windings are configured to generate a second magnetic field that causes axial magnetic forces to be applied to the thrust bearing disk.

2. The system of claim 1, wherein the thrust bearing disk is non-laminated and cageless.

3. The system of claim 1, wherein the stator core is laminated.

4. The system of claim 1, wherein the stator core is non-laminated and formed from a soft magnetic composite.

5. The system of claim 1, wherein each of the first windings is positioned radially outward from the second windings.

6. The system of claim 1, further comprising,
   a shaft coupled to the thrust bearing disk and configured to rotate about the longitudinal axis in response to the torque applied to the thrust bearing disk; and
   at least one radial magnetic bearing configured to generate radial magnetic forces sufficient to support the shaft without contacting the shaft.

7. A method of slow roll control, comprising:
   magnetically supporting a rotor including a shaft configured to rotate about a longitudinal axis and a ferromagnetic thrust bearing disk extending outward therefrom;
   generating a first magnetic field that rotates in a predetermined rotational direction about the longitudinal axis and causes a torque to be applied to the thrust bearing disk in the predetermined rotational direction;
   generating a second non-rotating magnetic field that is configured to cause axial magnetic forces to be applied to the thrust bearing disk; and
   varying the torque applied to the thrust bearing disk to cause the shaft to rotate at a predetermined rotational speed;
   wherein the first magnetic field is generated by a pair of stators, each positioned on axially opposing sides of the thrust bearing disk, each of the pair of stators comprising,
      a ring-shaped stator core defining an aperture extending therethrough, and
      two or more first windings each having a generally toroidal shape and coupled to the stator core at positions circumferentially offset from one another.

8. The method of claim 7, wherein each of the pair of stators further includes second windings configured to generate the second non-rotating magnetic field, the second windings having a generally circular shape coupled to the stator core at a position approximately coaxial with the stator core aperture.

* * * * *